Jan. 22, 1957  D. D. MENZ  2,778,051
PIVOTED TRACK MECHANISM FOR FLUSH SLIDING DOORS
Filed Jan. 23, 1953  2 Sheets-Sheet 1

*INVENTOR.*
DARWIN D. MENZ
BY
*Knox & Knox*
AGENTS

Jan. 22, 1957             D. D. MENZ             2,778,051
PIVOTED TRACK MECHANISM FOR FLUSH SLIDING DOORS
Filed Jan. 23, 1953
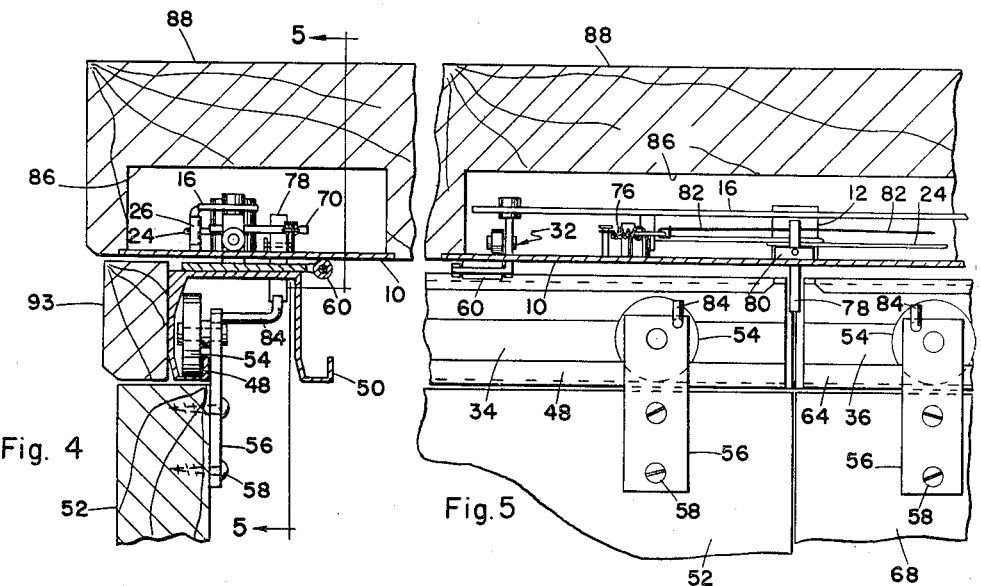
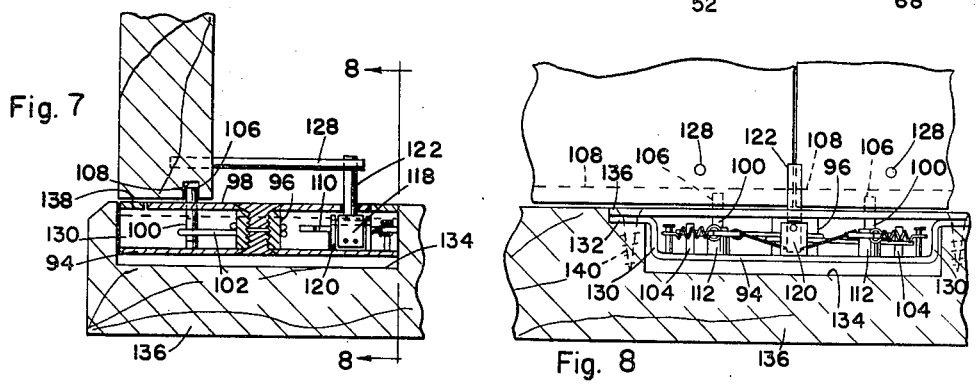
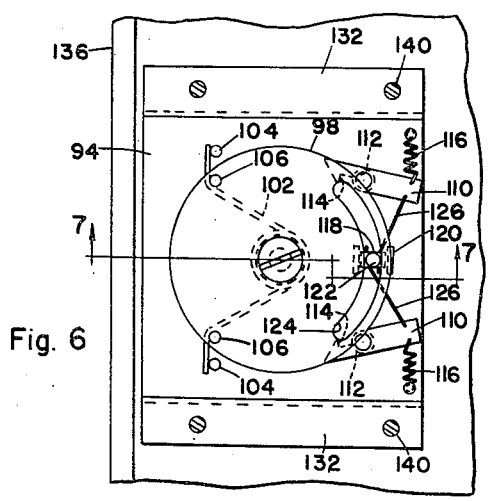
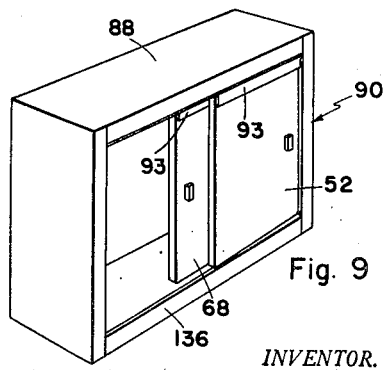
*INVENTOR.*
DARWIN D. MENZ
BY
Knox & Knox
AGENTS

United States Patent Office 2,778,051
Patented Jan. 22, 1957

2,778,051
PIVOTED TRACK MECHANISM FOR FLUSH SLIDING DOORS

Darwin D. Menz, San Diego, Calif.

Application January 23, 1953, Serial No. 332,932

8 Claims. (Cl. 16—96)

The present invention relates generally to sliding doors and more particularly to a pivoted track mechanism for use with flush type sliding doors, the term "door" including panels.

The track mechanism described herein is one which may be fitted to sliding doors of the type which are opened by depressing the end of one such door so that it may slide behind the adjacent door, and when closed will return to the flush position.

The primary object of this invention is to provide a pivoted track mechanism which will automatically lock in position when the edge of one door is depressed, allowing said door to slide freely behind the adjacent door.

Another object of this invention is to provide a pivoted track mechanism which will automatically return the door to the flush fitting position as said door is closed.

Another object of this invention is to provide a pivoted track mechanism which may be fitted to many types of structure having a plurality of flush type sliding doors.

Another object of this invention is to provide a pivoted track mechanism which is adapted for fabrication from many different materials, so that the choice of material can be according to the dictates of availability and price considerations, the exact sizes and proportions being matters easily determined to suit particular conditions and needs.

Another object of this invention is to provide a pivoted track mechanism which is inexpensive and practicable to manufacture.

Finally, it is an object to provide a pivoted track mechanism of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 4 is a sectional view taken on the line 4—4 of Fig. 1.

Fig. 5 is a sectional view taken on the line 5—5 of Fig. 4.

Fig. 6 is a plan view of the mechanism fitted at the lower edges of the sliding doors with the cover plate removed for clarity.

Fig. 7 is a sectional view taken on the line 7—7 of Fig. 6.

Fig. 8 is a sectional view taken on the line 8—8 of Fig. 7.

Fig. 9 is a perspective view of a cabinet having the flush type sliding doors described herein.

Figure 1:
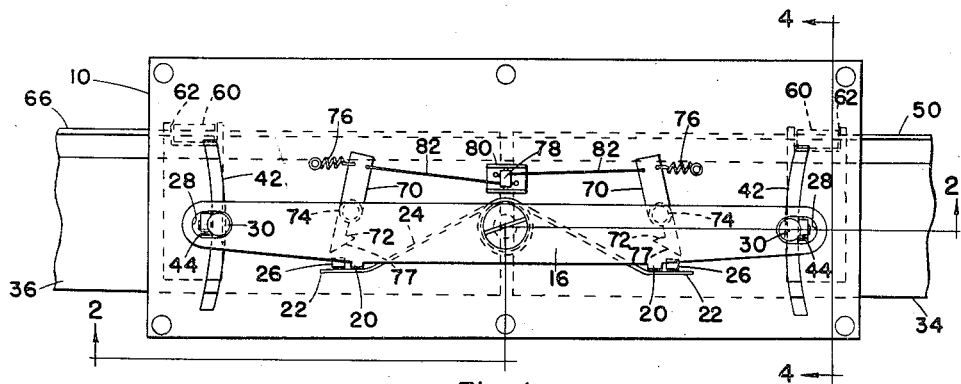
Fig. 1 is a plan view of the pivoted track mechanism fitted at the upper edges of the sliding doors.
Figure 2:
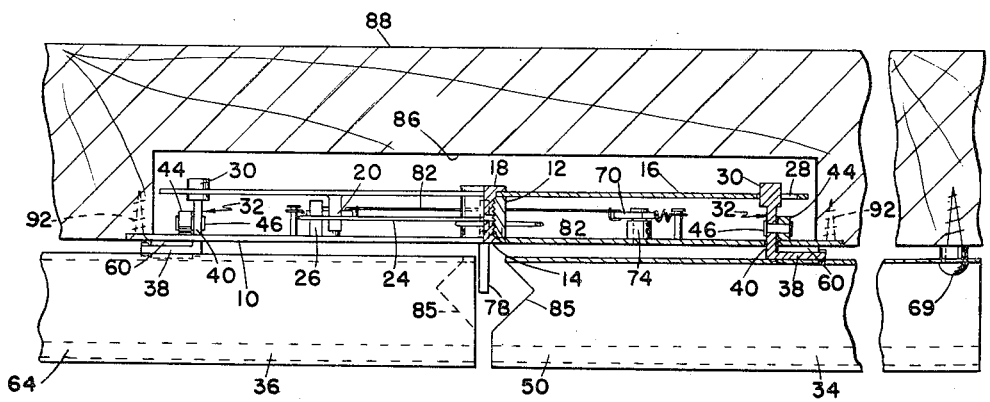
Fig. 2 is a sectional view taken on the line 2—2 of Fig. 1.

Referring now to the drawing in detail, the device consists of a pivoted track mechanism installed at the upper edges of sliding doors and carrying tracks upon which the doors slide. The lower edges of the sliding doors are also engaged by a similar type mechanism which guides and stabilizes said doors.

The upper track mechanism comprises a mounting plate 10 having a bearing block 12 secured thereto by means of a screw 14. The bearing block 12 serves as a support for a pivoted arm 16 which is pivotally mounted thereon and fastened by a screw 18. The pivoted arm 16 is provided with two downwardly projecting lugs 20 which are engaged by the free ends 22 of a return spring 24, said return spring being looped around the bearing block 12 and extending equally to either side of said bearing block. The free ends 22 project slightly beyond the lugs 20 and rest against upwardly projecting fixed lugs 26 secured to the mounting plate 10, so retaining the pivoted arm 16 in longitudinal alignment with said mounting plate.

At each end of the pivoted arm 16 is a slotted hole 28, each hole 28 receiving an upwardly projecting plug 30 of a roller carriage 32. The two roller carriages 32 are fastened directly to the door tracks which, for convenience, will hereinafter be referred to as the right hand track 34 and the left hand track 36.

The roller carriages 32 each comprise a bracket 38 having at one side a vertical stem 40 at the upper end of which is the plug 30 previously referred to. The bracket 38 is installed below the mounting plate 10 so that the stem 40 projects upwardly through an arcuate slot 42 in said mounting plate and is provided with a roller 44 rotatably mounted on a shaft 46 which is secured to said stem. The roller 44 rests on the upper surface of the mounting plate 10 and provides a friction free support for the door track during the opening and closing actions which will be later described. The right hand track 34 consists of two parallel rails, namely, a front rail 48 and a rear rail 50, each of said rails being substantially J-shaped. The door 52 is suspended from the right hand track 34 by means of rollers 54 rotatably mounted on plates 56 which are secured to said doors by means of screws 58, said rollers riding in the channel formed by the lower portion of the J-shaped front rail 48 as illustrated in Fig. 4.

It will be noted that the door 52 is suspended forwardly of the roller 44 and as this would tend to tilt the roller carriage 32, the bracket 38 is provided with an alignment roller 60 rotatably mounted in a recess 62 in said bracket, said roller riding against the lower surface of the mounting plate 10 behind the door track.

The left hand track 36 consists of a front rail 64 and a rear rail 66 which are similar in shape and size to those of the right hand track 34, and the door 68 is suspended from the front rail 64 in a manner similar to that described above. Both the right hand track 34 and the left hand track 36 are pivotally mounted at their outer ends to the surrounding structure in which the doors are fitted, by means of screws 69.

Figure 3:
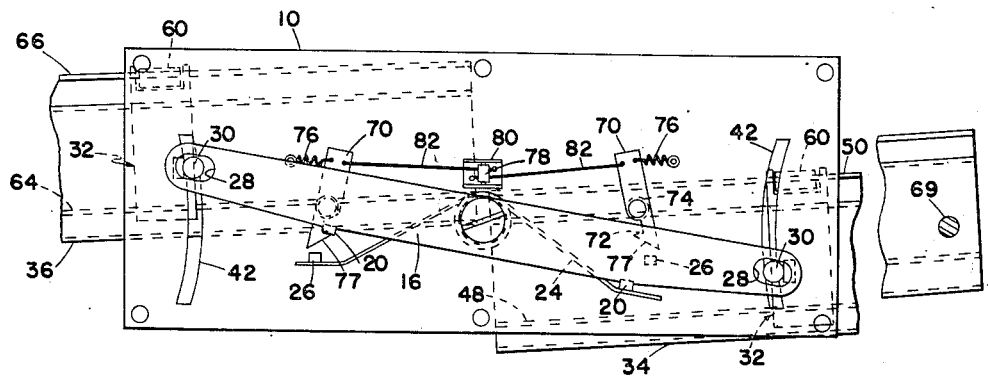
Fig. 3 is a plan view of the mechanism showing the door tracks in the open position.

When the inner edge of one door is depressed inwardly, it will be seen that the door track from which that door is suspended will move inwardly on its roller carriage and in doing so will rotate the pivoted arm 16 to the position shown in Fig. 3, which action will also move the other door track outwardly. In this position, that is, with the left hand track 36 disposed inwardly and the right hand track 34 disposed outwardly, it will be seen that the front rail 64 is brought into alignment with the rear rail 50 so that the door 68 may be pushed along on its rollers and transferred from said front rail to said rear rail. Thus the door 68 may now be completely passed behind the door 52.

It will be obvious that the reverse action may take place in a similar manner, that is, the door 52 may be passed behind the door 68.

In order to facilitate the opening and closing of the doors while the door tracks are offset, the tracks are retained in this position by a locking mechanism which includes two pawls 70 having notches 72, said pawls being pivotally attached to supports 74 secured to the mounting plate 10. The pawls 70 are positioned so that the lugs 20 will be engaged in the notches 72 as each end of the pivoted arm 16 is moved inwardly, said pawls being biased by means of springs 76 to ensure a firm grip on said lugs. The pawls 70 are further provided with sloping edges 77 so that the lugs 20 may force said pawls outwardly against the tension of the springs 76 to allow said lugs to fall into the notches 72.

In order to return the door tracks to the closed position it is necessary to actuate the pawl 70 to release the lug 20. It will be seen that the spring 24 is engaged at one end by the other lug 20, which is not held by the pawl mechanism, while the other end of said spring is retained by the fixed lug 26, so imparting a bias to the pivoted arm 16. As soon as the lug 20 is released from the pawl 70, the bias of the spring 24 will return the pivoted arm 16 and at the same time move the door tracks to their neutral or closed position.

The pawls 70 are actuated for the releasing movement by means of a trip lever 78 pivotally suspended from a bracket 80 which is attached to the mounting plate 10. The pawls 70 are provided with trip wires 82 which are passed through the trip lever 78 above the pivot point, the lower end of said trip lever extending downwardly below the mounting plate 10, each of the plates 56, secured to the inner edge of the respective doors 52 and 68, is provided with a trip arm 84 which extends behind said door to strike the lower end of the trip lever 78 as the door is closed. The right hand track 34 and the left hand track 36 each have a cut out portion 85 to provide clearance for the offset trip lever 78 as said tracks move to the closed position. Thus, it will be seen that as the door is closed the action of the trip arm 84 striking the trip lever 78 will actuate the pawl 70, so releasing the pivoted arm 16 and allowing the spring 24 to return the door tracks to the closed position.

The mechanism is normally fitted above the sliding doors in a suitable cavity 86 in the top panel 88 of the structure surrounding the doors, a particular example of the installation being the cabinet 90 illustrated in Fig. 9. The mechanism is secured by means of screws 92 passed through suitable holes in the mounting plate 10. In order to improve the outward appearance of the sliding door installation, the door tracks are concealed by means of cover strips 93 secured directly to said door tracks.

The lower edges of the doors are guided and stabilized by a mechanism having an action similar to that described above, but differing slightly in structure.

The lower mechanism comprises a mounting bracket 94 having a centrally located bearing block 96 on which a disc 98 is mounted for oscillatory movement analogous to the rocking movement of arm 16. The disc 98 is provided with two lugs 100 which extend downwardly and are engaged by a spring 102 fitted around the bearing block 96, said spring extending beyond said lugs and resting against the fixed lugs 104 extending upwardly from the mounting bracket 94.

The lugs 100 also have upwardly projecting stubs 106 which engage in guide slots 108 in the doors 52 and 68, thus holding said doors in true alignment.

As one of the doors is depressed inwardly to start the opening action, the stub 106 engaged therein will cause the disc 98 to rotate against the tension of the spring 102. In order to retain the doors in the offset position, a locking device similar to that previously described is used, in which two pawls 110 are pivotally mounted on supports 112, said pawls having notches 114 and being biased by means of springs 116. As the pivoted disc 98 rotates, one of the lugs 100 will fall into the notch 114 of the respective pawl 110 so locking said disc and indirectly locking the doors, in the offset position for opening, the action being simultaneous with that of the upper door tracks.

The lugs 100 are released from the pawls 110 by means of a trip mechanism including a trip lever 118 pivotally mounted in a bracket 120, said lever having a stem 122 extending upwardly through an arcuate slot 124 in the disc 98. The pawls 110 are provided with trip wires 126 connected to the trip lever 118 below the pivot point, said trip lever being actuated by means of trip arms 128 extending rearwardly from the doors, so that said trip arms strike the stem 122 as the doors are closed.

The mounting bracket 94 is provided with vertical end portions 130 which have outwardly extended flanges 132, said mounting bracket being fitted into a cavity 134 in the base member 136 of the structure surrounding the doors. The mechanism is concealed by means of a cover plate 138 having a circular opening to fit over the disc 98, said cover plate being secured by means of screws 140 which also serve to secure the mounting bracket 94 as illustrated in Fig. 8.

The mechanism described herein may be applied to flush type sliding doors in any suitable structure and is not limited to use with one pair of doors, but may also be fitted to a structure having more than two of such doors and using one complete mechanism for each pair of doors. In this way any one of the doors in such an installation may be slid behind either adjacent door, which provides an efficient and compact means of access to the space within the structure.

The operation of this invention will be clearly comprehended from a consideration of the foregoing description of the mechanical details thereof, taken in connection with the drawings and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawings are to be considered as merely illustrative rather than limiting.

I claim:

1. A pivoted track mechanism for flush type sliding doors including a mounting plate, an arm element pivotally mounted thereon, door guiding means having two parts each pivotally attached at their adjacent ends to said arm element, locking means comprising a pair of latches on said plate and cooperating lugs correspondingly positioned on said arm element to retain said two parts in an offset relation, and release means for said locking means comprising a latch trip mechanism mounted on said plate, and trip mechanism operating members securable to the doors for engagement of the trip mechanism when the doors are closed.

2. A pivoted track mechanism according to claim 1 wherein said door guiding means includes door tracks whereon doors may be suspended by their upper edges, and biasing means to urge said door guiding means into flush relationship when the doors are closed, thereby bringing the doors into flush relationship.

3. The combination of a pivoted track mechanism according to claim 1, and doors suspended from said door guiding means and having grooves in the lower edges of the doors, and door guiding means operatively engaged in said grooves, and said last mentioned door guiding means including further means to urge said doors into flush relationship when the doors are closed.

4. In a pivoted track mechanism for flush type sliding doors, a mounting plate, a pivoted arm pivotally secured on said mounting plate and having slotted holes at the ends of said pivoted arm, roller carriages suspended from said mounting plate and including upwardly extending plug portions, said mounting plate having arcuate slots therein, said plug portions extending through said arcuate slots and engaging with said slotted holes at the ends of said pivoted arm, door tracks having their adjacent ends suspended from the corresponding roller carriages, locking means for retaining said pivoted arm in an offset position and release means for said locking means, said door tracks having their remote ends pivotally suspended from surrounding structure.

5. In a pivoted track mechanism for flush type sliding doors, a mounting plate, a pivoted arm pivotally secured on said mounting plate and having slotted holes at the ends of said pivoted arm, roller carriages suspended from said mounting plate and including upwardly extended plug portions, said mounting plate having arcuate slots therein, said plug portions extending through said arcuate slots and engaging with said slotted holes, door tracks having their adjacent ends suspended from the corresponding roller carriages, said door tracks each comprising a front rail and a rear rail and being pivotally suspended at their remote ends from surrounding structure, whereby the front rail of one of said door tracks aligns with the rear rail of the other of said door tracks when said pivoted arm is in an offset position, locking means for retaining said pivoted arm in an offset position and release means for said locking means.

6. A pivoted track mechanism according to claim 5 wherein said locking means includes lugs extending from said pivoted arm, spring biased pawls pivotally mounted so that one of said lugs will be engaged by one of said pawls when said pivoted arm is in an offset position.

7. A pivoted track mechanism according to claim 6 wherein said release means includes a pivotally mounted trip lever extending downwardly through said mounting plate, trip wires connecting said trip lever to said pawls, trip arms attached to said doors whereby said trip arms actuate said trip lever as said doors are closed.

8. A pivoted track mechanism for flush type sliding doors comprising; a mounting plate, a member mounted thereon for rocking movement, door guiding double tracks centrally divided into two track parts having their adjacent ends pivotally secured to said member to provide for offsetting of the track parts to obtain selective registration of individual tracks in the adjacent ends of the track parts, and means to bias said member to a neutral position wherein the adjacent ends of said track parts are in full registration so that the doors are flush when closed, said biasing means comprising a pair of plugs on said member at opposite sides of the pivot point thereof, a pair of lugs on said mounting plate adjacent the first mentioned lugs when said member is in said neutral position, and a spring mounted centrally of said member and having its ends contacting all said lugs when said member is in said neutral position and biasing the first mentioned lugs toward the corresponding second mentioned lugs.

References Cited in the file of this patent

UNITED STATES PATENTS

| | | |
|---|---|---|
| 2,170,870 | Nichols | Aug. 29, 1939 |
| 2,610,367 | Nordahl | Sept. 16, 1952 |

FOREIGN PATENTS

| | | |
|---|---|---|
| 41,591 | France | Feb. 7, 1933 |
| | (Addition to 714,761) | |
| 714,761 | France | Nov. 19, 1931 |